US008206502B2

(12) United States Patent
Gruenbaum

(10) Patent No.: US 8,206,502 B2
(45) Date of Patent: Jun. 26, 2012

(54) TITANYL PHTHALOCYANINE WITH IMPROVED MILLING PROPERTIES

(75) Inventor: William T. Gruenbaum, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 790 days.

(21) Appl. No.: 12/334,878

(22) Filed: Dec. 15, 2008

(65) Prior Publication Data

US 2010/0151367 A1 Jun. 17, 2010

(51) Int. Cl.
- C09B 47/04 (2006.01)
- C09B 47/30 (2006.01)
- C09B 67/22 (2006.01)
- C09B 67/52 (2006.01)
- G03G 5/06 (2006.01)
- G03G 15/02 (2006.01)

(52) U.S. Cl. ...... 106/411; 106/410; 430/57.1; 430/59.4; 430/59.5; 540/122; 540/123; 540/128; 540/139; 540/140; 540/141

(58) Field of Classification Search ............ 106/410, 106/411, 412; 430/57.1, 59.4, 59.5; 540/122, 540/123, 128, 139, 140, 141
See application file for complete search history.

(56) References Cited

U.S. PATENT DOCUMENTS

| 4,970,021 | A | * | 11/1990 | Nakatsuka et al. | 252/299.01 |
|---|---|---|---|---|---|
| 4,981,767 | A | | 1/1991 | Tokura et al. | |
| 5,112,711 | A | | 5/1992 | Nguyen et al. | |
| 5,182,382 | A | | 1/1993 | Mayo et al. | |
| 5,206,359 | A | * | 4/1993 | Mayo et al. | 540/141 |
| 5,304,445 | A | * | 4/1994 | Itagaki et al. | 430/58.8 |
| 5,354,635 | A | | 10/1994 | Itami et al. | |
| 5,494,767 | A | * | 2/1996 | Itagaki et al. | 430/78 |
| 5,614,342 | A | | 3/1997 | Molaire et al. | |
| 5,626,999 | A | * | 5/1997 | Itagaki et al. | 430/78 |
| 5,629,418 | A | | 5/1997 | Molaire et al. | |
| 5,663,326 | A | * | 9/1997 | Wolleb | 540/139 |
| 5,733,695 | A | | 3/1998 | Molaire et al. | |
| 5,773,181 | A | | 6/1998 | Molaire et al. | |
| 5,817,804 | A | * | 10/1998 | Wolleb | 540/139 |
| 5,847,114 | A | * | 12/1998 | Thetford et al. | 540/140 |
| 6,284,420 | B1 | * | 9/2001 | Liu et al. | 430/59.5 |
| 6,368,399 | B1 | * | 4/2002 | Aoba et al. | 106/411 |
| 6,384,027 | B1 | * | 5/2002 | Cook | 514/189 |
| 6,506,244 | B1 | * | 1/2003 | Nagasue et al. | 106/412 |
| 6,514,651 | B1 | | 2/2003 | Hayata | |
| 6,949,139 | B2 | * | 9/2005 | Molaire et al. | 106/412 |
| 7,008,742 | B2 | | 3/2006 | Molaire | |
| 7,033,715 | B2 | * | 4/2006 | Molaire | 430/59.5 |
| 7,033,716 | B2 | | 4/2006 | Molaire et al. | |
| 7,034,148 | B2 | * | 4/2006 | Beyrich et al. | 540/139 |
| 7,211,359 | B2 | | 5/2007 | Molaire et al. | |
| 7,332,261 | B2 | * | 2/2008 | Seino et al. | 430/270.16 |
| 7,709,633 | B2 | * | 5/2010 | Indusegaram et al. | 540/145 |
| 7,905,952 | B2 | * | 3/2011 | Lee et al. | 106/411 |
| 8,110,038 | B2 | * | 2/2012 | Tanaka et al. | 106/411 |
| 2007/0111122 | A1 | * | 5/2007 | Molaire | 430/59.5 |
| 2009/0293769 | A1 | * | 12/2009 | Lee et al. | 106/411 |
| 2011/0023752 | A1 | * | 2/2011 | Tanaka et al. | 106/411 |

FOREIGN PATENT DOCUMENTS

| EP | 0 661 353 | 7/1995 |
|---|---|---|
| GB | 2 322 866 | 9/1998 |

* cited by examiner

*Primary Examiner* — Anthony J Green
(74) *Attorney, Agent, or Firm* — Andrew J. Anderson

(57) ABSTRACT

The invention is directed to mixtures of PcTiO and a minor amount of another, substituted titanyl phthalocyanine and the synthesis of mixtures of PcTiO and a minor amount of another, substituted titanyl phthalocyanine. The invention is further directed towards milled pigment compositions of such mixtures, and to use of such milled pigment compositions in an electrophotographic element.

19 Claims, No Drawings

TITANYL PHTHALOCYANINE WITH IMPROVED MILLING PROPERTIES

FIELD OF THE INVENTION

The present invention relates to the field of electrophotographic pigments. More particularly the present invention relates to compositions comprising titanyl phthalocyanine and a minor amount of another, substituted titanyl phthalocyanine and the synthesis of compositions comprising titanyl phthalocyanine and a minor amount of another, substituted titanyl phthalocyanine.

BACKGROUND OF THE INVENTION

In electrophotography, an image comprising a pattern of electrostatic potential, also referred to as an electrostatic latent image, is formed on a surface of an electrophotographic element comprising at least two layers: a photoconductive layer and an electrically conductive substrate. The electrostatic latent image can be formed by a variety of means, for example, by imagewise radiation-induced discharge of a uniform potential previously formed on the surface. Typically, the electrostatic latent image is then developed into a toner image by contacting the latent image with an electrographic developer. If desired, the latent image can be transferred to another surface before development.

Among the many different kinds of photoconductive materials that have been employed in electrophotographic elements are phthalocyanine pigments such as titanyl phthalocyanine and titanyl tetrafluorophthalocyanines. Electrophotographic recording elements containing such pigments as charge-generation materials are useful in electrophotographic laser beam printers because of their capability for providing good photosensitivity in the near infrared region of the electromagnetic spectrum, that is, in the range of 700-900 nm.

The pigment titanyl phthalocyanine (PcTiO) as synthesized is not in the optimum crystal form for electrophotography. PcTiO can be converted to the optimum form by any of several techniques including acid pasting or some form of mechanical milling. For a discussion of the crystal forms of titanyl phthalocyanine used in electrophotography see P. M. Borsenberger and D. S. Weiss; *Organic Photoreceptors for Imaging Systems* (New York: Marcel Dekker, 1993), 356-361. Specific examples of crystal form interconversions include the following:

Acid pasting PcTiO with $MeSO_3H$—$CH_2Cl_2$: R. S. Gaims, E. S. C. Simpson, J. A. Stewart, L. M. Traynor (Zeneca Ltd.); G. B. Patent 2322866 (Sep. 9, 1998).

Mechanically mixing PcTiO and $F_4PcTiO$ to form a cocrystalline mixture: M. F. Molaire, J. E. Kaeding (Eastman Kodak); U.S. Pat. No. 5,614,342 (Mar. 25, 1997).

Acid pasting $F_nPcTiO$ with $H_2SO_4$: M. F. Molaire, J. E. Kaeding, W. T. Gruenbaum (Eastman Kodak); U.S. Pat. No. 5,629,418 (May 13, 1997).

Mixing two or more pigments from $PcH_2$, PcCu, PcTiO and PcVO in aqueous alcohol to effect a crystal structure change: T. Ohashi, M. Hayashi (Mitsubishi Chemical Corp.); E. P. 661353 (Jul. 5, 1995).

Acid pasting mixtures of $R_nPcTiO$ and $R'_nPcVO$ in $H_2SO_4$: A. Itami, K. Watanabe (Konica Corp.); U.S. Pat. No. 5,354,635 (Oct. 11, 1994).

Acid pasting PcTiO with $CF_3COOH$—$CH_2Cl_2$: J. D. Mayo, J. M. Duff, T. L. Bluhm, C. K. Hsiao (Xerox Corp.); U.S. Pat. No. 5,182,382 (Jan. 26, 1993).

Salt milling PcTiO and $F_4PcTiO$ to form a cocrystalline mixture: K. C. Nguyen, T. R. Klose (Eastman Kodak); U.S. Pat. No. 5,112,711 (May 12, 1992).

Simultaneous vapor deposition of two phthalocyanines: S. Suzuki, J. Gouda, H. Toda, A Itsubo, T Sasaki, (Mitsubishi Petrochemical Co.); U.S. Pat. No. 4,981,767 (Jan. 1, 1991).

The disadvantage of acid pasting is the large quantity of concentrated sulfuric acid that must be used and the subsequent disposal of such sulfuric acid. In addition, PcTiO slowly decomposes in sulfuric acid. Organic acid pasting systems such as trifluoroacetic acid/dichloromethane have similar or worse disposal problems. Mechanical milling is more economical than acid pasting in terms of materials since no solvent is used and the milling media may be reusable. But, milling typically is a slower process than acid pasting and consumes considerable amounts of mechanical energy and milling vessel time. Therefore, the synthesis of a more easily milled form of titanyl phthalocyanine would be advantageous.

SUMMARY OF THE INVENTION

The present invention is directed to compositions comprising PcTiO and a minor amount of another, substituted titanyl phthalocyanine as well as the synthesis of compositions comprising PcTiO and a minor amount of another, substituted titanyl phthalocyanine. The compositions of the present invention have been show to have improved milling properties.

One embodiment of the present invention encompasses a method for synthesizing a crystalline product comprising a mixture of phthalocyanines $A_4PcM$, $A_3BPcM$, $A_2B_2PcM$, $AB_3PcM$ and $B_4PcM$. The general structure of PcM is shown below wherein M represents a pair of hydrogen atoms or a covalent or coordinate bonded moiety including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb. "A" and "B" are different and are selected from the group including hydrogen, halogen, alkyl, and alkoxy. "A" and "B" may represent more than one substituent on each isoindoline moiety of the PcM structure. In the synthesis, the mole fractions of starting materials are adjusted so that the crystalline mixture contains a majority of $A_4PcM$, a lesser amount of $A_3BPcM$, and traces of $A_2B_2PcM$, $AB_3PcM$ and $B_4PcM$. The synthesis is carried out at a temperature of less than 150° C.

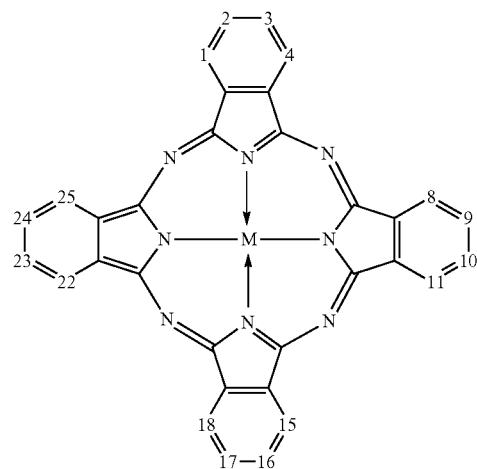

DETAILED DESCRIPTION OF THE INVENTION

The present invention relates to the synthesis of a composition comprising PcTiO and a minor amount of another, substituted titanyl phthalocyanine. The presence of the substituted titanyl phthalocyanine expedites the mechanical milling of the pigment into the optimum crystal form for electrophotography.

The synthesis of a mixture of phthalocyanines from the starting reagents in accordance with the instant invention, rather than simply mixing two or more previously prepared pigments, yields a mixture of pigments at the molecular level, with the minor component(s) an integral part of the crystal structure of the final mixed pigment, where the effect of the substituent(s) on milling is maximized. Such an intimate mixture of pigments would be unattainable by the mechanical milling of two separately synthesized compounds.

The substituted titanyl phthalocyanines, XPcTiO, which improve the milling of PcTiO when present as minor components, are synthetically inaccessible as pure compounds. Thus, the invention provides a method for a more subtle form of crystallinity disruption than can be achieved by mixing small amounts of synthetically accessible $X_4$PcTiO with PcTiO.

The present inventors have surprisingly observed that titanyl phthalocyanine prepared from phthalonitrile and titanium (IV) chloride in chlorinated aromatic solvents, such as 1-chloronaphthalene, at greater than 200° C., in accordance with the method taught in U.S. Pat. No. 5,773,181 (hereinafter referred to as the "high temperature method") is easier to mill than PcTiO prepared from phthalonitrile, a titanium(IV) alkoxide, an amide, and an alcoholic solvent at less than 150° C. (hereinafter "low temperature method") [J. Yao, H. Yonehara, C. Pac; *Bull. Chem. Soc. Jpn.* 1995, 68, 1001-1005]. The high temperature pigment is more expensive, because of the high cost of the chlorinated aromatic solvent, 1-chloronaphthalene, and because of the greater amount of energy needed to maintain the reaction above 200° C. for several hours.

The difference between the two pigments is the presence of about 1% chlorine in the high temperature method pigment, presumably present as a mixture of 1-ClPcTiO and 2-ClPcTiO. The occasional chlorine atom disrupts the crystallinity of the PcTiO enough to facilitate mechanical milling. Since the pigment from the low temperature method is less expensive, one objective of the present invention is to synthesize a more easily milled PcTiO using the low temperature method. More specifically, the object of the present invention is to synthesize a mixture of PcTiO and a minor amount of another, substituted titanyl phthalocyanine, XPcTiO, the presence of which expedites the mechanical milling of the pigment into the optimum crystal form for electrophotography.

Phthalocyanines are prepared by combining four phthalonitrile (PN) moieties (or an equivalent, such as four diiminoisoindolines) and a source of the central metal atom, [M], into each phthalocyanine ring. M in the product PcM may be two hydrogen atoms, two monovalent metal atoms such as Li or Na, a divalent metal such as Cu or Ni, trivalent such as Al—OH or Ga—OH, or tetravalent such as Ti=O or $SiCl_2$:

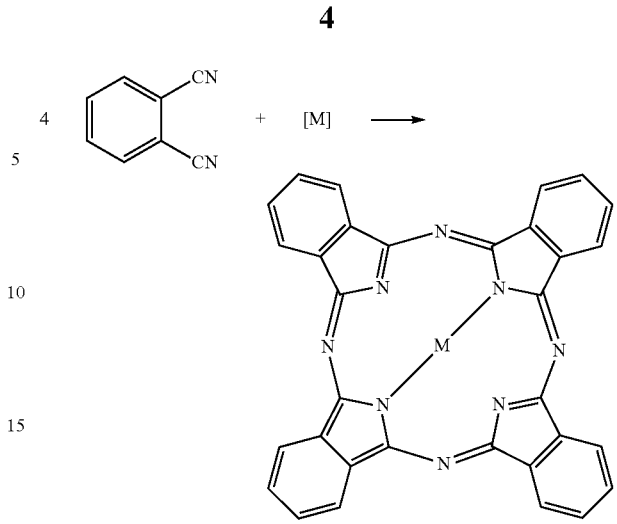

When two different phthalonitriles, designated A-PN and B-PN, are used, the phthalocyanine product mixture is as follows, where a=molar equivalents of A-PN, b=molar equivalents of B-PN, and a+b=1:

$$a(A\text{-}PN)+b(B\text{-}PN)+[M] \rightarrow A_4PcM+A_3BPcM+ A_2B_2PcM+AB_3PcM+B_4PcM$$

The amount of each product is given by the expansion of $(ax+by)^4$:

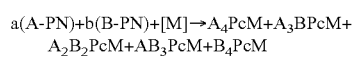

where:
  $x^4=A_4$PcM
  $a^4$=equivalents of $A_4$PcM in the product mixture
  $x^3y=A_3$BPcM
  $4a^3b$ =equivalents of $A_3$BPcM in the product mixture
  $x^2y^2=A_2B_2$PcM
  $6a^2b^2$=equivalents of $A_2B_2$PcM in the product mixture
  $xy^3=AB_3$PcM
  $4ab^3$=equivalents of $AB_3$PcM in the product mixture
  $y^4=B_4$PcM
  $b^4$=equivalents of $B_4$PcM in the product mixture For example, if A-PN is phthalonitrile, i.e., A=hydrogen, B-PN is any 4-X-phthalonitrile, a=0.96, and b=0.04, then the predicted product mixture in moles is:

$$(0.96)^4PcM+4(0.96)^3(0.04)XPcM+6(0.96)^2 (0.04)^2X_2PcM+4(0.96)(0.04)^3X_3PcM+ (0.04)^4X_4PcM$$

or, expressed as mole percentages:

$$84.93\% \text{ PcM}+14.16\% \text{ XPcM}+0.93\% \text{ } X_2\text{PcM}+0.026\% X_3\text{PcM}+0.00028\% X_4\text{PcM}.$$

For the case of phthalonitrile combined with 4-X-phthalonitrile and a source of titanium, the chemnical structures of the starting materials and products are shown below. Only one of the possible isomers is shown for $X_2$PcTiO, $X_3$PcTiO, and X4PcTiO.

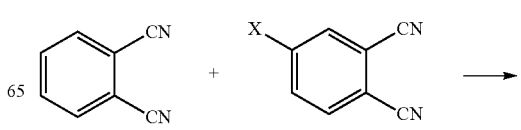

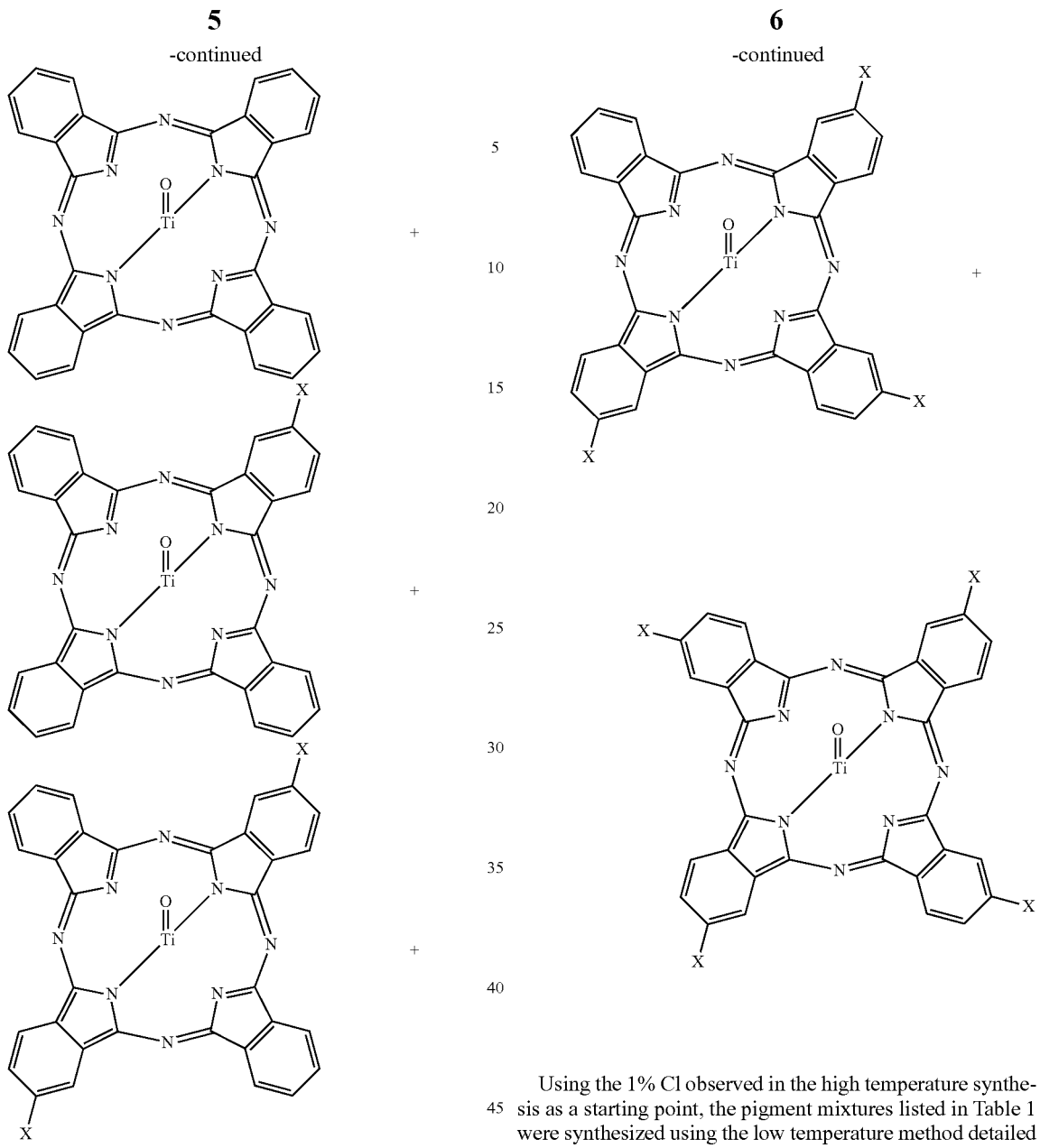

Using the 1% Cl observed in the high temperature synthesis as a starting point, the pigment mixtures listed in Table 1 were synthesized using the low temperature method detailed later in Example 1:

TABLE 1

Synthetic mixtures of PcTiO and XPcTiO.

| # | X-PN | [PN] | [X-PN] | PcTiO | XPcTiO | X₂PcTiO | % Cl aim | % Cl found | % Ti aim | % Ti found | Mill? |
|---|---|---|---|---|---|---|---|---|---|---|---|
| 1.1 | 4-Cl | 0.9505 | 0.0495 | 81.6 | 17.0 | 1.3 | 1.20 | 1.5 | 8.21 | 8.2 | + |
| 1.2 | 4-Cl | 0.9755 | 0.0245 | 90.6 | 9.1 | 0.3 | 0.6 | 0.8 | 8.26 | 8.4 | + |
| 1.3 | 4,5-Cl₂ | 0.9500 | 0.0500 | 81.5 | 17.2 | 1.4 | 2.40 | 2.9 | 8.12 | 7.7 | + |
| 1.4 | 4,5-Cl₂ | 0.9750 | 0.0250 | 90.4 | 9.3 | 0.4 | 1.22 | 1.4 | 8.21 | 8.2 | + |
| 1.5 | 4,5-Cl₂ | 0.9750 | 0.0250 | 90.4 | 9.3 | 0.4 | 1.22 | 1.4 | 8.21 | 8.4 | + |
| 1.6 | 4,5-Cl₂ | 0.9750 | 0.0250 | 90.4 | 9.3 | 0.4 | 1.22 | 1.5 | 8.21 | 8.3 | + |
| 1.7 | 4,5-Cl₂ | 0.9880 | 0.0120 | 95.3 | 4.6 | <0.1 | 0.59 | 0.7 | 8.26 | 7.7 | − |
| 1.8 | 4,5-Cl₂ | 0.9940 | 0.0060 | 97.6 | 2.4 | <0.1 | 0.29 | 0.35 | 8.29 | 8.1 | − |
| 1.9 | 4,5-Me₂ | 0.9750 | 0.0250 | 90.4 | 9.3 | 0.4 | — | — | 8.27 | 8.5 | + |
| 1.10 | 4,5-Me₂ | 0.9880 | 0.0120 | 95.3 | 4.6 | <0.1 | — | — | 8.29 | 8.1 | − |
| 1.11 | 4,5-Me₂ | 0.9940 | 0.0060 | 97.6 | 2.4 | <0.1 | — | — | 8.30 | 7.8 | − |
| 1.12 | 4-tert-Bu | 0.9940 | 0.0060 | 97.6 | 2.4 | <0.1 | — | — | 8.29 | 8.3 | − |
| 1.13 | 4,5-OCH₂O— | 0.9750 | 0.0250 | 90.4 | 9.3 | 0.4 | — | — | 8.25 | 8.4 | +/− |

TABLE 1-continued

Synthetic mixtures of PcTiO and XPcTiO.

| # | X-PN | [PN] | [X-PN] | PcTiO | XPcTiO | $X_2$PcTiO | % Cl aim | % Cl found | % Ti aim | % Ti found | Mill? |
|---|---|---|---|---|---|---|---|---|---|---|---|
| 1.14 | 4,5-(MeO)$_2$ | 0.9750 | 0.0250 | 90.4 | 9.3 | 0.4 | — | — | 2.22 | 8.3 | − |
| 1.15 | 4-F | 0.9750 | 0.0250 | 90.4 | 9.3 | 0.4 | (0.33% F) | (0.3% F) | 8.28 | 8.8 | − |
| 1.16 | none | 1.0000 | 0 | 100 | 0 | 0 | 0.00 | <0.01 | 8.31 | 8.1 | − |
| 1.17 | none | 1.0000 | 0 | 100 | 0 | 0 | 0.00 | 0.02 | 8.31 | 8.5 | − |

X-PN is the substitution pattern on the minor phthalonitrile starting material.
[PN] and [X-PN] are the mole fractions of the two phthalonitrile starting materials.
PcTiO, XPcTiO, and $X_2$PcTiO are the mole percentages predicted for the three most abundant titanyl phthalocyanine products. $X_3$PcTiO and $X_4$PcTiO will be less than 0.05% in all examples listed.
% Cl aim and % Ti aim are the weight percents calculated for the predicted product mixture.
% Cl found and % Ti found are the actual weight percents, measured by neutron activation analysis
Mill? indicates whether the synthetic pigment mixture was (+) or was not (−) converted to the optimum electrophotographic crystal form by the standard mechanical milling technique.

Entry 1.1 shows that a mixture of PcTiO and 2-ClPcTiO deliberately synthesized with about 1 weight % Cl is in fact readily converted into the optimum crystal form by mechanical milling.

Entry 1.2 shows that improved milling also occurs with only half as much 2-ClPcTiO.

Entries 1.3-1.8 show that the improved milling is not a function of the amount of chlorine per se, but of the amount of minor pigment, XPcTiO, present in the synthesized mixture. Thus, entry 1.3, with 17.5 mole % 2,3-Cl$_2$PcTiO, and entries 1.4-1.6, with 9.3 mole % 2,3-Cl$_2$PcTiO were all converted to the optimum electrophotographic crystal form by mechanical milling, but entry 1.7, with only 4.6 mole % 2,3-Cl$_2$PcTiO, was not, even though entry 1.7 contains the same weight % chlorine as entry 1.2.

Entries 1.9-1.11 show that the improvement in milling is not limited to X=Cl. Entry 1.9 with 9.3 mole % titanyl 2,3-dimethylphthalocyanine, 2,3-Me$_2$PcTiO, was converted to the optimum crystal form by milling, while entries 1.10 and 1.11, with less minor pigment, were not.

Entries 1.8, 1.11, and 1.12 show that 2.4 mole % minor pigment is not enough to improve milling, even if the substituent is the large tert-butyl group.

Entries 1.13-1.15 show that not all substituents improve milling, even at the 9.3 mole % minor pigment level:

Entry 1.13 was converted to the optimum crystal form by milling, but a trace of another crystal form was also observed in the X-ray diffraction spectrum.

Entry 1.14 shows that two large methoxy groups did not improve the milling of PcTiO.

Entry 1.15 shows that one fluorine atom is not a large enough substituent to improve the milling of PcTiO.

Entries 1.16 and 1.17 are controls for the low temperature synthetic method. Pure PcTiO synthesized by this procedure was not converted to the optimum crystal form by mechanical milling.

The pigments listed in Table 1 were milled and coated as the charge generation layer (CGL) of a multilayer photoconductor package comprised of a poly(ethylene terephthalate) (PET) supporting film, a nickel conducting layer, a polyamide barrier layer, the CGL containing the synthetic pigment mixture, and a charge transporting layer (CTL). Table 2 records the results of electrophotographic and spectroscopic testing of these photoconductors.

TABLE 2

Results of photoconductor evaluation.

| Pigment # | Ctg. No. | Minor PcTiO | % Minor | XRD | $\lambda_{max}$ | $A_{max}$ | E50 | DD | b | d |
|---|---|---|---|---|---|---|---|---|---|---|
| 1.1 | 2.1 | 2-ClPcTiO | 17.0 | 7.4 | 857 | 1.72 | a) | — | — | — |
| 1.2 | 2.2 | 2-ClPcTiO | 9.1 | 7.4 | 860 | 1.68 | a) | — | — | — |
| 1.3 | 2.3 | 2,3-Cl$_2$PcTiO | 17.2 | 7.4 | 857 | 1.86 | 0.86 | 31.8 | 0.956 | 0.063 |
| 1.4 | 2.4 | 2,3-Cl$_2$PcTiO | 9.3 | 7.4 | 861 | 1.60 | 1.55 | 6.3 | 0.584 | 0.088 |
| 1.5 | 2.5 | 2,3-Cl$_2$PcTiO | 9.3 | 7.4 | 862 | 1.45 | 1.74 | 10.5 | 0.548 | 0.093 |
| 1.7 | 2.6 | 2,3-Cl$_2$PcTiO | 4.6 | 7.4 + 26.1 | 818 | 2.20 | 2.29 | 2.0 | 0.406 | 0.063 |
| 1.8 | 2.7 | 2,3-Cl$_2$PcTiO | 2.4 | 26.1 | 783 | 2.34 | 2.35 | 2.0 | 0.391 | 0.059 |
| 1.9 | 2.8 | 2,3-Me$_2$PcTiO | 9.3 | 7.4 | 850 | 1.51 | 1.51 | 7.7 | 0.635 | 0.092 |
| 1.10 | 2.9 | 2,3-Me$_2$PcTiO | 4.6 | 26.1 | 779 | 2.24 | 2.67 | 2.9 | 0.360 | 0.090 |
| 1.11 | 2.10 | 2,3-Me$_2$PcTiO | 2.4 | 26.1 | 808 | 1.76 | 3.06 | 2.8 | 0.311 | 0.087 |
| 1.13 | 2.11 | 2,3-OCH$_2$O—PcTiO | 9.3 | 7.4 + tr 27.2 | 850 | 1.66 | a) | — | — | — |
| 1.12 | 2.12 | 2-tert-BuPcTiO | 2.4 | 26.1 + tr 7.4 | 804 | 2.32 | 2.31 | 2.8 | 0.407 | 0.076 |
| 1.14 | 2.13 | 2,3-(MeO)$_2$PcTiO | 9.3 | 26.1 > 7.4 | 783 | 1.64 | 2.43 | 9.1 | 0.400 | 0.112 |
| 1.15 | 2.14 | 2-FPcTiO | 9.3 | 26.1 > 7.4 | 823 | 1.21 | 2.52 | 2.4 | 0.386 | 0.109 |

TABLE 2-continued

Results of photoconductor evaluation.

| Pigment # | Ctg. No. | Minor PcTiO | % Minor | XRD | $\lambda_{max}$ | $A_{max}$ | E50 | DD | b | d |
|---|---|---|---|---|---|---|---|---|---|---|
| 1.16 | 2.15 | none | | 26.1 | 855 | 0.94 | 3.50 | 2.4 | 0.274 | 0.135 |
| | Control I | | | | 871 | 1.17 | 0.89 | 3.3 | 1.000 | 0.073 |
| | Control II | | | | 874 | 1.19 | 0.91 | 4.0 | 1.000 | 0.050 |
| | Control III | | | | 873 | 1.19 | 0.94 | 4.1 | 1.000 | 0.058 |

% Minor = Mole % minor PcTiO in synthetic mixture with PcTiO
XRD = Maximum peak (degrees-2θ) in the X-ray diffraction spectrum of the synthetic mixture after mechanical milling. 7.4 indicates the optimum electrophotographic form. 26.1 indicates the less photoactive form. tr = trace.
$\lambda_{max}$ = Wavelength in nm of maximum absorbance in the electronic absorption spectrum of the photoconductor film. A peak around 860 nm is characteristic of the optimum electrophotographic form. Maxima at shorter wavelengths (780-810 nm) indicate the less photoactive form. Entry 2.15 is an exception. The CGL of the control films contains 25% of $F_4$PcTiO and exhibit maxima at the longer wavelengths listed.
E50 = Energy in erg/cm² required to discharge the film from $V_0$ to 50% of $V_0$. Aim $V_0$ = −500 V. Flash exposure at 775 nm for 160 μsec.
a) Film would not hold a −500 V surface charge.
DD = Dark decay in V/sec.
b = Intrinsic photoconductor sensitivity normalized with respect to the control for that coating.
d = Intrinsic photoconductor toe. Parameters b and d were calculated using the photodischarge equation disclosed in A. V. Buettner (Heidelberger Druckmaschinen AG); U.S. Pat. No. 6,647,219 (Nov. 11, 2003): $V = V_0[(1 − d)\exp(−(bE)^c) + d]$ Both films #2.1 and #2.2 had PcTiO/2-ClPcTiO in the optimum 7.4 degrees-2θ (hereafter °2θ) crystal form as the photosensitive pigment in the CGL, as indicated by the electronic absorption maxima around 860 nm, but neither film would hold a surface charge. This result was unexpected knowing that the PcTiO/ClPcTiO synthesized by the high temperature method did function as a charge generating pigment.

Films with optimum 7.4 °2θ crystal form PcTiO/2,3-Cl$_2$PcTiO (#2.3-2.5) or PcTiO/2,3-Me2PcTiO (#2.8) and with at least 9 mole % minor pigment performed well as organic photoconductors. Film #2.3 with 17.2 mole % 2,3-Cl$_2$PcTiO did exhibit higher dark decay. The electronic absorption spectra of these films featured maxima in the 850-862 nm range, indicative of the optimum 7.4 °2θ crystal form.

In the films of PcTiO/2,3-Cl$_2$PcTiO (#2.6-2.7) and PcTiO/2,3-Me$_2$PcTiO (#2.9-2.10) with only 4.6 or 2.4 mole % minor pigment, the pigments were partially or entirely in the slower 26.1 °2θ crystal form and as a consequence the films exhibited slower photodecay speeds. The visible absorption spectra of these films had maximum absorbances in the 770-818 nm range. The large blue shift relative to the films with 7.4 °2θ crystal form pigments is characteristic of the slower 26.1 °2θ crystal form.

In another unexpected example (cf. entries 2.1 and 2.2), film #2.11 with 9.3 mole % titanyl 2,3-methylenedioxyphthalocyanine would not hold a surface charge, even though most of the pigment was in the optimum 7.4 °2θ crystal form. The trace of a second crystal form characterized only by a peak at 27.2 °2θ presumably contributed to the poor chargeability.

In films #2.12-2.14, most of the CGL pigment is in the slower 26.1 °2θ crystal form, as indicated by the slower photodecay speeds and absorption maxima in the 783-823 nm range.

Film #2.15 demonstrates that pure PcTiO, that is, with no minor component XPcTiO, prepared by the low temperature method, was not converted to the optimum 7.4 °2θ crystal form by the standard mechanical milling procedure. The maximum absorption at 855 nm in #2.15 is real, but the overall spectrum of that film matched those of others in the slower 26.1 °2θ crystal form.

The charge generation layers of control films 2.16-2.18 were prepared from a mechanical mixture of PcTiO and $F_4$PcTiO as taught in U.S. Pat. No. 5,614,342. In controls 2.16-2.18, the optimum crystal form and performance are realized, but at the cost of synthesizing a second, expensive pigment, $F_4$PcTiO, and an additional milling step. In the current invention, only one pigment synthesis is required, using the more economical low temperature method, and the optimum crystal form can be achieved in a single milling.

The above results show that synthetic mixtures of PcTiO and a minor amount of XPcTiO prepared by the more economical low temperature preparative method did form the optimum 7.4 °2θ crystal form during mechanical milling and were used to prepare high performance organic photoconductors.

2-ClPcTiO, 2,3-Cl$_2$PcTiO, and 2,3-Me$_2$PcTiO improved the milling of PcTiO when present at 9.1 mole % or higher. 2,3-Cl$_2$PcTiO and 2,3-Me$_2$PcTiO did not improve milling when present at 4.6 or 2.4 mole %. PcTiO plus 2.4% of 2-(tert-Bu)PcTiO also showed only a trace of the optimum form after mechanical milling.

Films with 2,3-Cl$_2$PcTiO and 2,3-Me$_2$PcTiO in the optimum crystal form yielded high performance photoconductors. Films with 2-ClPcTiO in the optimum crystal form would not hold a surface charge.

Other minor pigments were less useful. Mechanical milling of PcTiO plus 9.3 mole % of 2,3-(OCH$_2$O)PcTiO formed a trace of a second crystal form that ruined the chargeability of the film. PcTiO plus 9.3 mole % of 2,3-(MeO)$_2$PcTiO or 9.3 mole % of 2-FPcTiO was only partially converted to the optimum crystal form by mechanical milling.

EXAMPLE 1

Synthetic Example. 90/9 PcTiO/2,3-Cl$_2$PcTiO

A mixture of phthalonitrile (49.97 g; 0.390 mol), 4,5-dichlorophthalonitrile (1.97 g; 0.0100 mole), benzamide (60.2 g; 0.50 mole), xylenes (90 mL), and 1-pentanol (52 mL; 0.48 mole) was stirred for 30 min to form a homogeneous slurry, then treated with titanium(IV) butoxide (36 mL; 0.102 mol). The reaction mixture was refluxed for 6 hr, cooled to room temperature, and filtered with xylene washing. The damp solid product was slurried four times in 1.6-L of hot N,N-dimethylformamide, once in 1.6-L of 50% aqueous methanol, once in 1.6-L of methanol, collected by filtration and dried under vacuum to yield 44.9 g (77%) of dark blue pigment. Analysis by mass spectrometry showed product ions at m/z 576 (M+, PcTiO) and 644 (22%, Cl$_2$PcTiO). Neutron activation analysis detected 1.4 wt % Cl (calcd=1.22%) and 8.3 wt % Ti (calcd 8.21%).

EXAMPLE 2

Comparative Synthetic Example. PcTiO

The procedure of the Synthetic Example was followed, with 51.2 g (0.40 mol) of phthalonitrile in place of the mixture of phthalonitrile and 4,5-dichlorophthalonitrile. Mass spectrum: m/z 576 (M+, PcTiO). Neutron activation analysis: 0.02 wt % Cl (calcd 0.00%), 8.5 wt % Ti (calcd 8.31%).

EXAMPLE 3

Milling Example

The PcTiO/2,3-Cl$_2$PcTiO mixture from the Synthetic Example (10.0 g) and 1200 g of 3-mm stainless steel shot were combined in a 16-oz. glass jar and roll-milled for 7 days at 75 rpm. Dichloromethane (200 mL) was added and the roll milling was continued for another 24 hours. The pigment was washed from the steel shot with solvent and collected by filtration. The X-ray diffraction spectrum of the pigment matched that of the optimum crystal form for electrophotography, characterized by peaks at 7.4 (maximum intensity peak), 10.2, 12.7, 13.1, 15.1, 16.1, 17.2, 18.3, 22.4, 24.2, 25.4, and 28.8±0.22 degrees-2θ.

EXAMPLE 4

Comparative Milling Example

The procedure of the Milling Example was used to mill 10.0 g of the PcTiO prepared in the Comparative Synthetic Example. The X-ray diffraction spectrum was the same as the unmilled, as-synthesized pigment, with peaks at 9.3, 10.6, 12.3, 13.1, 15.0, 15.7, 16.0, 16.9, 18.7, 20.8, 23.2, 25.5, 26.1 (maximum intensity peak), 27.0, 28.2, 29.5, and 32.7±0.22 degrees-2θ.

EXAMPLE 5

Photoconductor Fabrication Example

The PcTiO/2,3-Cl$_2$PcTiO mixture from the Milling Example (2.0 g) was dispersed with 2.0 g of a polyester ionomer binder [M. F. Molaire, L. J. Sorriero (Eastman Kodak); U.S. Pat. No. 5,733,695 (Mar. 31, 1998), "Electrophotographic element with charge-generating layer containing polyester ionomer"], 60 g of dichloromethane, 40 g of 1,1,2-trichloroethane, and 60 g of stainless steel shot on a Sweco mill. The dispersion was separated from the steel shot, diluted with additional solvent to 3 wt % solids, and X-hopper coated on a poly(ethylene terephthalate) support that had been previously coated with a nickel conducting layer and a polyamide barrier layer so that the final pigmented, charge generation layer (CGL) was 0.75 µm thick. A charge transport layer (CTL) was applied to the CGL by overcoating with a 10 wt % solids dichloromethane solution of tri-p-tolylamine (TTA), 1,1-bis(di-p-tolylamino)phenylcyclohexane (TAPC), and a polyester binder [L. J. Sorriero, M. B. O'Regan, P. M. Borsenberger (Eastman Kodak); U.S. Pat. No. 5,786,119 (Jul. 28, 1998), "Electrophotographic elements having charge transport layers containing high mobility polyester binders."] in a weight-to-weight ratio of 20/20/60 so that the final CTL was apx. 23 µm thick. The electronic absorption spectra and the results of flash sensitometry (160 µm sec flash at 775 nm) for two similar films are listed in Table 2, Entries #2.4 and 2.5, above.

EXAMPLE 6

Comparative Photoconductor Fabrication Example

The method described in the Photoconductor Fabrication Example was used to prepare an organic photoconductive film using the PcTiO pigment from the Comparative Milling Example. The absorption spectrum and results of flash sensitometry are listed in Table 2, Entry #2.15, above.

The invention has been described in detail with particular reference to certain preferred embodiments thereof, but it will be understood that variations and modifications can be effected within the spirit and scope of the invention.

What is claimed is:

1. A method for preparing a phthalocyanine composition comprising the steps of:
   synthesizing a crystalline product comprising a mixture of phthalocyanines including:
   a first phthalocyanine having the general formula A$_4$PcM,
   a second phthalocyanine having the general formula A$_3$BPcM,
   a third phthalocyanine having the general formula A$_2$B$_2$PcM,
   a fourth phthalocyanine having the general formula AB$_3$PcM, and
   a fifth phthalocyanine having the general formula B$_4$PcM,
   wherein: PcM in the above formulas, represents a member selected from the group consisting of moieties having the general structure:

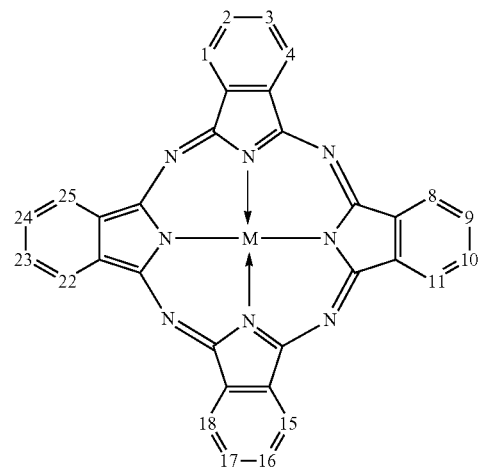

wherein
   M represents a pair of hydrogen atoms or a covalent or coordinate bonded moiety including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb;
   A and B are different and are selected from the group including hydrogen, halogen, alkyl, and alkoxy;
   A and B may represent more than one substituent on each isoindoline moiety of the PcM structure; and the mole fractions of starting materials are adjusted so that the crystalline mixture contains a majority of $A_4PcM$, a lesser amount of $A_3BPcM$, and traces of $A_2B_2PcM$, $AB_3PcM$ and $B_4PcM$; and the synthesis is at a temperature of less than 150° C., and milling said mixture to form a pigment.

2. The method of claim 1, wherein M=TiO.

3. The method of claim 1, wherein $A_4PcTiO$ is 80-99% of the pigment mixture, $A_3BPcTiO$ is 1-19%, and the sum of $A_2B_2PcTiO+AB_3PcTiO+B_4PcTiO$ is less than 1%.

4. The method of claim 3, wherein A=hydrogen and B=chlorine or methyl.

5. The method of claim 4, wherein A=hydrogen and B=2,3-$Cl_2$ or 2,3-$Me_2$.

6. The method of claim 5, wherein the pigment mixture is 90% PcTiO (A=H), 9% 2,3-$Cl_2$PcTiO (A=H; B=2,3-dichloro), and the sum of minor pigments $Cl_4$PcTiO+$Cl_6$PCTiO+$Cl_8$PcTiO is less than 1%.

7. The method of claim 1, wherein M is selected from the group consisting of TiO, VO, Cu, Zn, Fe, Co, Ni, Ru, Rh, Pd, Pt, Mn, Sn, Al—Cl, Al—Br, In—Cl, In—Br, In—I, $SiCl_2$, $SiBr_2$, $SiF_2$, $SnCl_2$, SnBr2, $SnF_2$, $GeCl_2$, $GeBr_2$, $GeF_2$, $Si(OH)_2$, $Ge(OH)_2$, Ga(O-methyl), Ga—OH, Ga—Cl, and Ga—Br.

8. A milled pigment composition crystalline mixture comprising a mixture of phthalocyanines including:
a first phthalocyanine having the general formula $A_4PcM$,
a second phthalocyanine having the general formula $A_3BPcM$,
a third phthalocyanine having the general formula $A_2B_2PcM$,
a fourth phthalocyanine having the general formula $AB_3PcM$, and
a fifth phthalocyanine having the general formula $B_4PcM$, wherein:
PcM in the above formulas, represents a member selected from the group consisting of moieties having the general structure:

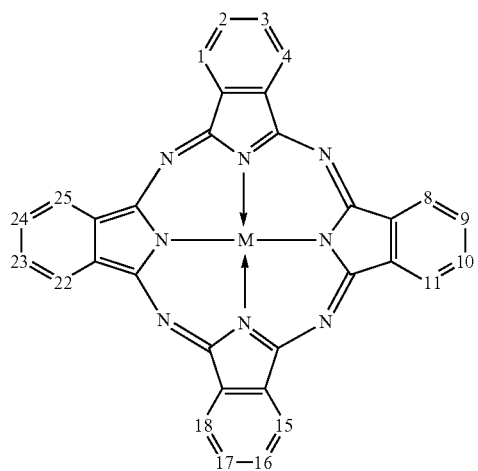

wherein M represents a pair of hydrogen atoms or a covalent or coordinate bonded moiety including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb;
A and B are different and are selected from the group including hydrogen, halogen, alkyl, and alkoxy;

A and B may represent more than one substituent on each isoindoline moiety of the PcM structure; and
the crystalline mixture contains a majority of $A_4PcM$, a lesser amount of $A_3BPcM$, and traces of $A_2B_2PcM$, $AB_3PcM$ and $B_4PcM$.

9. The milled pigment composition of claim 8, wherein M=TiO.

10. The milled pigment composition of claim 8, wherein $A_4PcTiO$ is 80-99% of the pigment mixture, $A_3BPcTiO$ is 1-19%, and the sum of $A_2B_2PcTiO+AB_3PcTiO+B_4PcTiO$ is less than 1%.

11. The milled pigment composition of claim 10, wherein A=hydrogen and B=chlorine or methyl.

12. The milled pigment composition of claim 11, wherein the pigment mixture is 90% PcTiO (A=H), 9% 2,3-$Cl_2$PcTiO (A=H; B=2,3-dichloro), and the sum of minor pigments $Cl_4$PcTiO+$Cl_6$PcTiO+$Cl_8$PcTiO is less than 1%.

13. The milled pigment composition of claim 8, wherein M is selected from the group consisting of TiO, VO, Cu, Zn, Fe, Co, Ni, Ru, Rh, Pd, Pt, Mn, Sn, Al—Cl, Al—Br, In—Cl, In—Br, In—I, $SiCi_2$, $SiBr_2$, $SiF_2$, $SnCl_2$, $SnBr_2$, $SnF_2$, $GeCl_2$, $GeBr_2$, $GeF_2$, $Si(OH)_2$, $Ge(OH)_2$, Ga(O-methyl), Ga—OH, Ga—Cl, and Ga—Br.

14. An electrophotographic element comprising a photoconductive layer and an electrically conductive substrate, wherein the photoconductive layer comprises a milled pigment composition crystalline mixture comprising a mixture of phthalocyanines including:
a first phthalocyanine having the general formula $A_4PcM$,
a second phthalocyanine having the general formula $A_3BPcM$,
a third phthalocyanine having the general formula $A_2B_2PcM$,
a fourth phthalocyanine having the general formula $AB_3PcM$, and
a fifth phthalocyanine having the general formula $B_4PcM$, wherein: PcM in the above formulas, represents a member selected from the group consisting of moieties having the general structure:

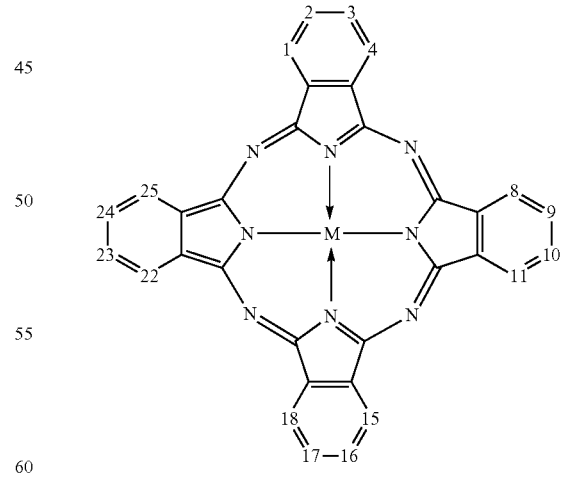

wherein M represents a pair of hydrogen atoms or a covalent or coordinate bonded moiety including an atom selected from the group consisting of Li, Na, K, Be, Mg, Ca, Ba, Sc, Y, La, Ac, Ti, Zr, Hf, V, Nb, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, and Sb;

A and B are different and are selected from the group including hydrogen, halogen, alkyl, and alkoxy;

A and B may represent more than one substituent on each isoindoline moiety of the PcM structure; and the crystalline mixture contains a majority of $A_4PcM$, a lesser amount of $A_3BPcM$, and traces of $A_2B_2PcM$, $AB_3PcM$ and $B_4PcM$.

15. The electrophotographic element of claim 14, wherein M=TiO.

16. The electrophotographic element of claim 14, wherein $A_4PcTiO$ is 80-99% of the pigment mixture, $A_3BPcTiO$ is 1-19%, and the sum of $A_2B_2PcTiO+AB_3PcTiO+B_4PcTiO$ is less than 1%.

17. The electrophotographic element of claim 16, wherein A=hydrogen and B=chlorine or methyl.

18. The electrophotographic element of claim 17, wherein the pigment mixture is 90% PcTiO (A=H), 9% 2,3-$Cl_2PcTiO$ (A=H; B=2,3-dichloro), and the sum of minor pigments $Cl_4PcTiO+Cl_6PcTiO+Cl_8PcTiO$ is less than 1%.

19. The electrophotographic element of claim 14, wherein M is selected from the group consisting of TiO, VO, Cu, Zn, Fe, Co, Ni, Ru, Rh, Pd, Pt, Mn, Sn, Al—Cl, Al—Br, In—Cl, In—Br, In—I, $SiCl_2$, $SiBr_2$, $SiF_2$, $SnCl_2$, $SnBr_2$, $SnF_2$, $GeCl_2$, $GeBr_2$, $GeF_2$, $Si(OH)_2$, $Ge(OH)_2$, Ga(O-methyl), Ga—OH, Ga—Cl, and Ga—Br.

* * * * *